United States Patent [19]
Noa

[11] 3,877,329
[45] Apr. 15, 1975

[54] TOOL SUPPORT WITH TOOL SLIDE VERTICALLY DISPLACEABLE THEREIN, WITH A TOOL EXCHANGING DEVICE ASSOCIATED WITH SAID TOOL SLIDE

[75] Inventor: Fritz Noa, Rheydt, Germany
[73] Assignee: Schiess Aktiengesellschaft, Dusseldorf, Germany
[22] Filed: June 20, 1973
[21] Appl. No.: 371,847

[30] Foreign Application Priority Data
June 21, 1972 Germany.............................. 2230144

[52] U.S. Cl..................... 82/2 R; 82/2 D; 82/24 R; 29/568; 408/35
[51] Int. Cl............................ B23b 3/06; B23b 7/16
[58] Field of Search ........... 82/24, 2 D, 25, 2, 36 R, 82/36 A; 29/568; 408/35

[56] References Cited
UNITED STATES PATENTS
| | | | |
|---|---|---|---|
| 3,186,085 | 6/1965 | Coate | 29/568 |
| 3,316,786 | 5/1967 | Coate | 82/36 |
| 3,354,761 | 11/1967 | Sadier | 82/2 |
| 3,466,739 | 9/1969 | Harman | 29/568 |

*Primary Examiner*—Leonidas Vlachos
*Attorney, Agent, or Firm*—Walter Becker

[57] ABSTRACT

A tool support with a tool slide vertically movable in the support, in which slide there is rotatably and axially displaceably mounted a spindle bar having its upper end engaged by a rotary drive and by a displacement drive, whereas the lower end of the spindle bar has disengageably connected thereto a tool head which is equipped with exchangeably arranged rotatable tools. The tool head is adapted to be locked to the lower end of the tool slide in certain pivoted positions of the tool head. The tool support according to the invention is characterized primarily in that through the spindle bar in the longitudinal direction thereof, there extends with sliding play, a pipe which is connected to a pressure conduit with a pneumatic or hydraulic pressure medium. This pipe leads into the tool head which is displaceable relative to the pipe end. Depending on the respective pivoted position of the tool head, the said pipe is, through bores, in communication with at least one cylinder bore in which a clamping bolt pulled in by spring force is located. This clamping bolt has a clamping jaw for chucking a turning tool arranged in a recess of the tool head and for releasing the turning tool in response to an axial displacement of the chucking bolt toward the outside against the spring force by a pressure medium passing into the cylinder bore.

5 Claims, 14 Drawing Figures

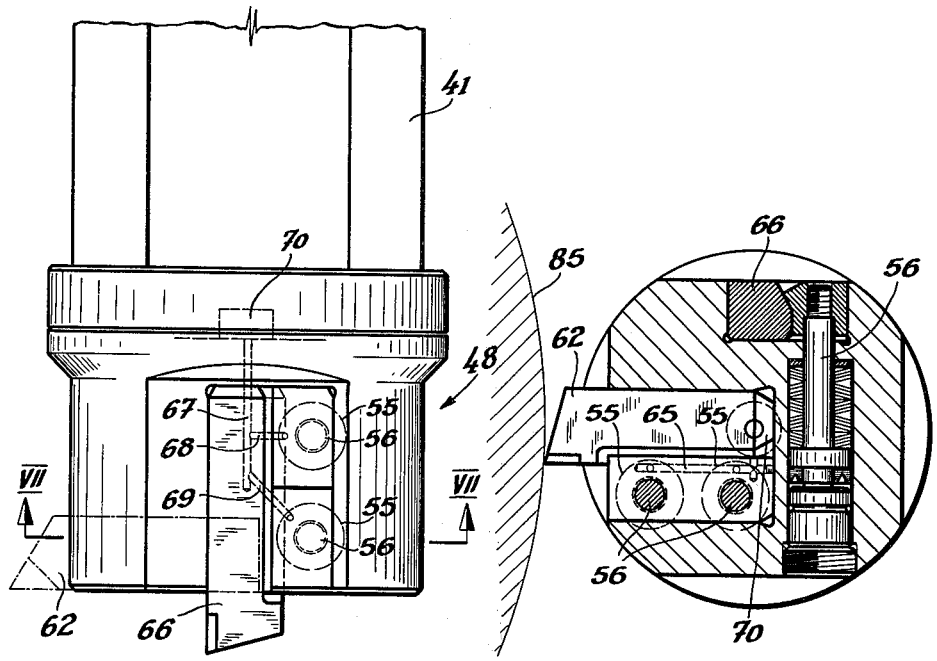
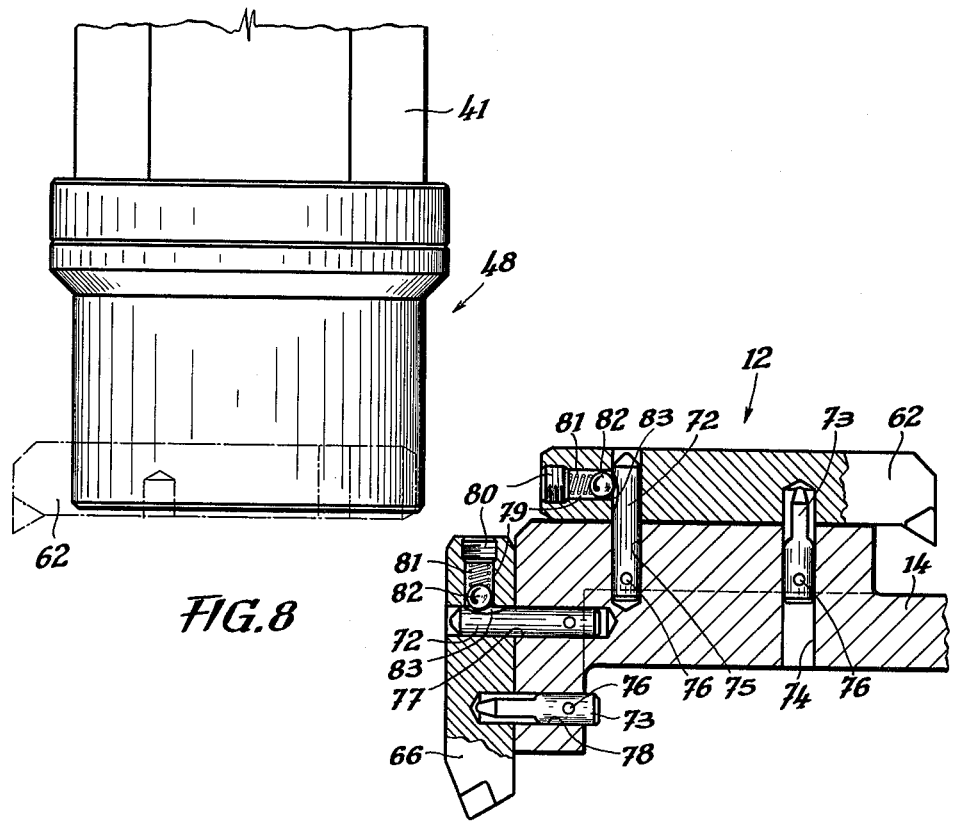

TOOL SUPPORT WITH TOOL SLIDE VERTICALLY DISPLACEABLE THEREIN, WITH A TOOL EXCHANGING DEVICE ASSOCIATED WITH SAID TOOL SLIDE

The present invention relates to a tool support with a chisel slide vertically movable in the support, in which slide there is rotatably and axially displaceably mounted a spindle bar having its upper end engaged by a rotary drive and by a displacement drive, whereas the lower end of the spindle bar has disengageably connected thereto a tool head which is equipped with exchangeably arranged rotatable chisels, the tool head being adapted to be locked to the lower end of the chisel slide in certain pivoted positions of the tool head. The invention is particularly suitable for a machine tool, especially a vertical turning machine with a tool exchanging device which is associated with the chisel slide and is intended for receiving different turning tools.

German Auslegeschrift No. 1,271,500 discloses a chisel or tool slide in which the spindle bar is designated as spindle sleeve and the lower free end of which detachably supports a tool head which is equipped with turning tools and locks the tool head to the lower end of the tool slide and after axial displacement permits a pivoting of the tool head to various working positions for employing the various turning tools. Through the spindle sleeve extends furthermore a drivable bearing spindle the lower end of which is adapted to receive an additional turning tool.

German Offenlegeschrift No. 1,752,681 describes a tool slide the tool head of which is adapted to be equipped with a single turning tool. The turning tool has associated therewith a tool exchanging device which is equipped with a plurality of tool heads and permits an automatic exchange of the tool heads on the tool slide.

Furthermore, French Pat. Nos. 1,444,093 and 1,500,191, Swiss Pat. No. 258,358, British Pat. No. 890,368 and U.S. Pat. No. 3,161,951 disclose machine tools which are equipped with tool heads and/or turret heads for receiving drills which respectively have associated therewith tool slides permitting an exchange of the individual drills. Thus, an exchange of drills is effected which by means of conical connecting ends are pulled into corresponding holding means of the tool head and are chucked thereto, and which are also held in readiness in corresponding receiving means of the tool exchanging device.

It is an object of the present invention to provide means which will make it possible automatically to exchange the individual turning tools of a tool head equipped with such turning tools by means of a tool exchanging device, similar to the employment of drills, so that it will no longer be necessary to exchange the entire tool head.

This object and other objects and advantages of the invention will appear more clearly from the following specification in connection with the accompanying drawings, in which:

FIG. 1 diagrammatically illustrates a partial view of a vertical turning machine.

FIG. 6 is a view of the lower end of the tool slide according to the invention with a tool head having a plurality of tools inserted therein.

FIG. 7 is a section taken along the line VII — VII of FIG. 6.

FIG. 8 illustrates the tool head in association with the tool exchanging device from which a portion of a section is shown, the tool head being connected to the lower end of the tool slide.

Figure 1:
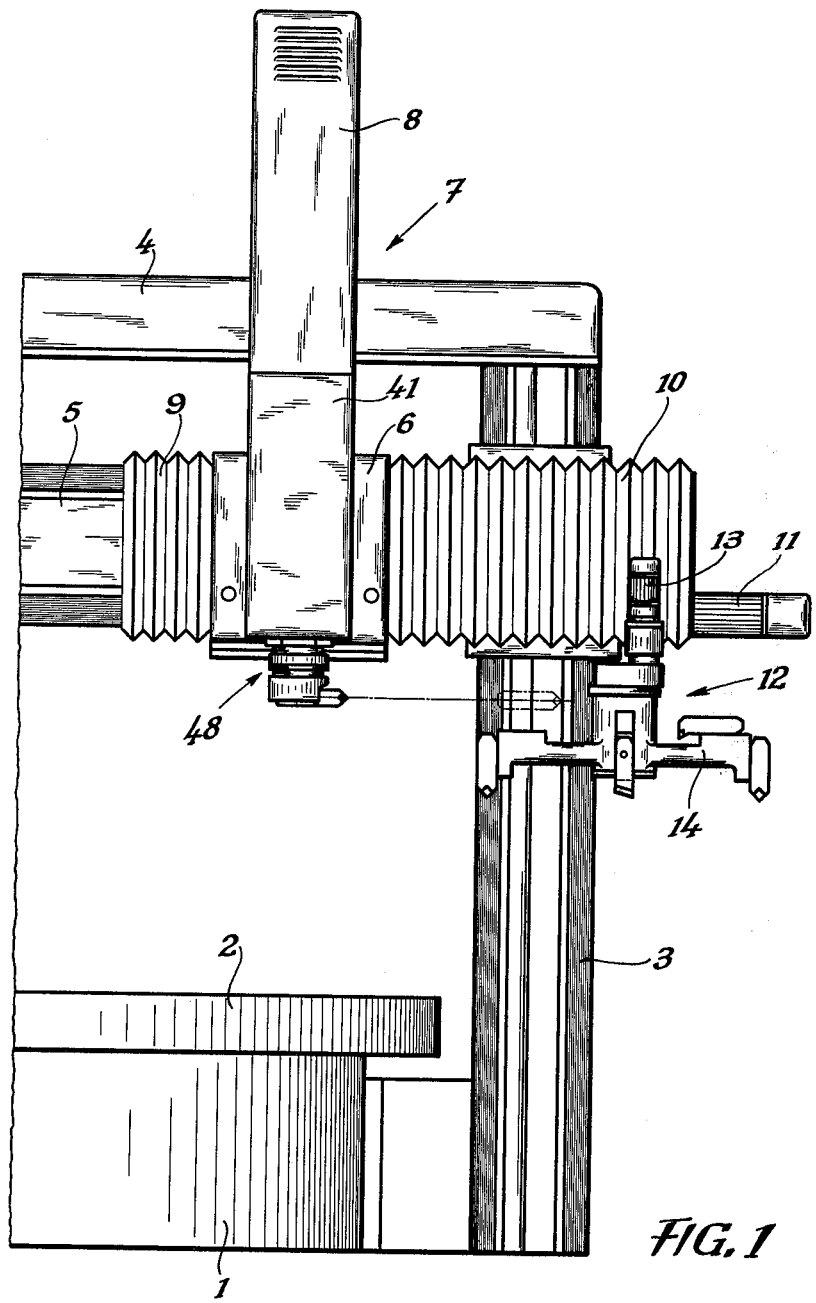

FIGS. 9 – 14 respectively illustrate in a diagrammatic manner the steps in connection with the tool exchange.

The tool support according to the present invention is characterized primarily in that through the spindle bar in the longitudinal direction thereof there extends with sliding play a pipe which is connected to a pressure conduit with a pneumatic or hydraulic pressure medium, which pipe leads into the tool head displaceable relative to the pipe end and, depending on the respective pivoted position of the tool head is in communication through bores with at least one cylinder bore in which a clamping bolt pulled-in by spring force is located which clamping bolt has a clamping jaw for chucking a turning tool arranged in a recess of the tool head and for releasing the turning tool in response to an axial displacement of the chucking bolt toward the outside against the spring force by a pressure medium passing into the cylinder bore.

By means of this arrangement it is possible automatically hydraulically or pneumatically to chuck or release turning tools in conformity with the respective pivoted position of the tool head without the necessity of any action on the part of the operator. Thus, means have been created which permit moving the support with tool slide and tool head to a tool exchanging device, to transfer to the latter a turning tool to be exchanged and to take on a new turning tool. Inasmuch as the chucking and releasing of the turning tools depends on the respective position of the tool head, the chucking and releasing position, i.e., the respective pivoted position of the tool head, can be set to conform to that of the respective tool exchanging device which in its turn is in customary manner adjusted by a corresponding pivoting movement in such a way that the respective tool receiving means or the respective turning tool to be transferred will occupy a position which is adapted to the position of the tool head.

This setting or adjusting may also automatically be carried out by arranging, in conformity with the present invention, within the region of the turning and displacement drive of the spindle bar at the outer circumference thereof a control ring and a control cam having limit switches associated therewith which control the turning and displacement drive as well as the chucking and releasing of the turning tools.

According to a further development of the invention, it may be provided that the tool exchanging device is, in conformity with the intended position of the turning tools, equipped with holdig pins which engage the respective turning tool in the transverse direction. The holding pins have associated therewith spring-loaded arresting bodies arranged in the turning tool. In this way it will be assured that the individual turning tools are held on the tool exchange device in their intended working position and are held in readiness for the exchange and their engagement with corresponding recesses in the tool head, but can be removed from the tool exchanging device in a simple manner and can also be deposited thereon and can be arrestable therewith.

Referring now to the drawings in detail, the vertical turning machine illustrated therein represents a two-stand machine. Between the stands 3 thereof, of which one only is shown, there is arranged the lower structure 1 with the face plate 2 for receiving the work piece. The two stands 3 are connected to each other at their upper ends by a cross beam 4. A cross beam 5 is vertically displaceable on the standds 3. Horizontally displaceable on the transverse beam 5 is a support 6 which in its turn is displaceable vertically and if desired may also have its receiving part pivotally arranged. The support 6 carries the tool slide 7 the upper end 8 of which is formed by a housing within which there is arranged the drive for the slide.

The guiding tracks for the transverse beam 5 are covered by covers 9 and 10. These covers are formed by bellows which can be expanded and pushed together. The support 6 is adapted to be driven by a geared engine 11 which is arranged at one end of the transverse beam 5. The same end of beam 5 also supports the tool exchanging device 12 with the drive motor 13 and the pivotable exchaning head 14 which, as will be seen from FIG. 1, is adapted to receive a number of tools distributed over the circumference, in various positions.

Figure 2:
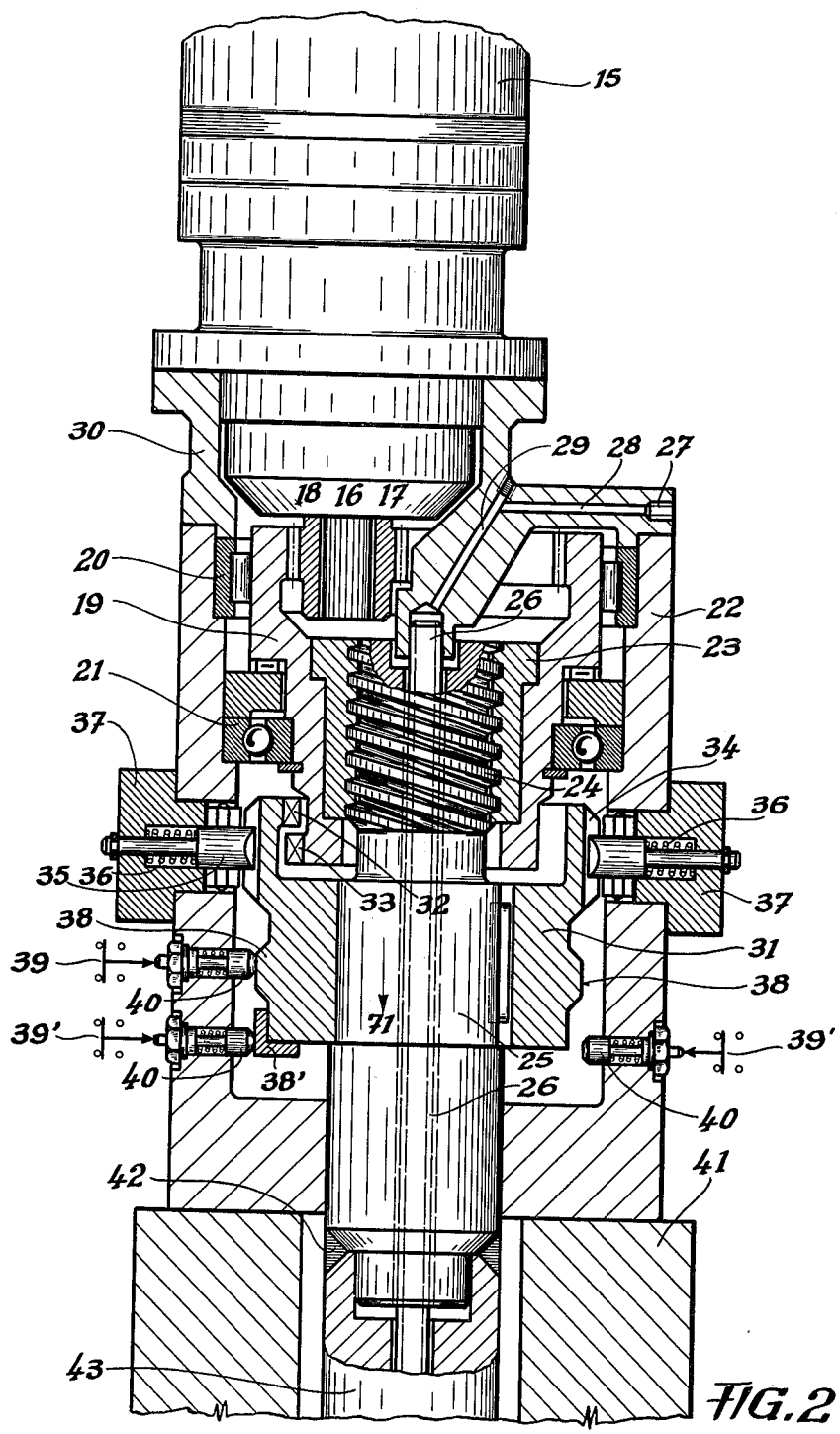
FIG. 2 illustrates on an enlarged scale partly in section the upper end of the tool slide according to the invention.

As will be seen from FIG. 2, a geared engine 15 is arranged within the housing 8 of FIG. 1. A pinion 17 engaging the inner gear ring 18 of sleeve 19 is mounted on the drive shaft 16 of the motor 15. The sleeve 19 is by means of anti-friction bearings 20 and 21 rotatably journalled in the cylindrical housing part 22 of the tool slide 7. Firmly connected to the sleeve 19 and arranged therein is a threaded nut 23 engaged by the spindle end 24 of the spindle stud 25 which forms the upper portion of a spindle bar composed of the spindle stud 25 and the extension shaft 43. A pipe 26 extends in longitudinal direction through the spindle bar and is adapted to receive a fluid medium through the connections 27 and the bores 28 and 29 in the housing head 30. The housing head 30 is mounted on the cylindrical housing part 22 and is firmly connected therewith.

Fixedly connected to and mounted on the spindle stud 25 in spaced relationship to and below the sleeve 19 there is a coupling and control body 31 which at the upper end radially inwardly directed supports a coupling jaw 32 which has associated therewith below and radially outwardly spaced therefrom a coupling jaw 33 located at the lower end of sleeve 19. The outer mantle surface of the coupling and control body 31 is equipped with teeth 34 which have associated therewith arresting pins 35 distributed over the circumference. These pins 35 rest radially outwardly through a spring 36 on the counter bearing body 37 which is connected to the cylindrical housing 22. The ends of the pins 35 which are directed toward the coupling and control body 31 are cut on an incline so that these pins 35 in response to a rotation of the spindle stud 25 are pressed raidally outwardly and after a corresponding rotation engage the coupling and control body 31 between two teeth 34. Below the teeth 34, the coupling and control body 31 has arranged a control ring 38, and at the outer circumference has arranged a control cam 38'. Limit switches 39, 39' are associated with the control cams 38' which limit switches are operable by means of spring-loaded control pins 40 when the latter move onto the control ring 38 or the control cam 38'. The limit switches 39' are intended to reverse the direction of roation of the motor 15 when the respective selected pivot position of the spindle stud 25 has been reached, while the limit switch 39 again stops the motor 15. Thus, for each desired pivot position a limit switch 39' is required which is controlled by a jack switch at the command station so as to be in a function-ready position. By means of extension elements, the pivotal drive is connected to the tool head.

The motor 15 is turned on by means of pressure keys whereas the pivot position of the tool head 48 is preselected by a jack switch at the command station whereby the corresponding limit switch 39' is placed into a functionally ready position.

Further downwardly adjacent the cylindrical housing body 22 there is provided the lower housing body 41 of the tool slide, whereas the spindle stud 25 is by means of a welding connection 42 connected to the extension shaft 43 which forms the lower part of the spindle bar.

Figure 3:
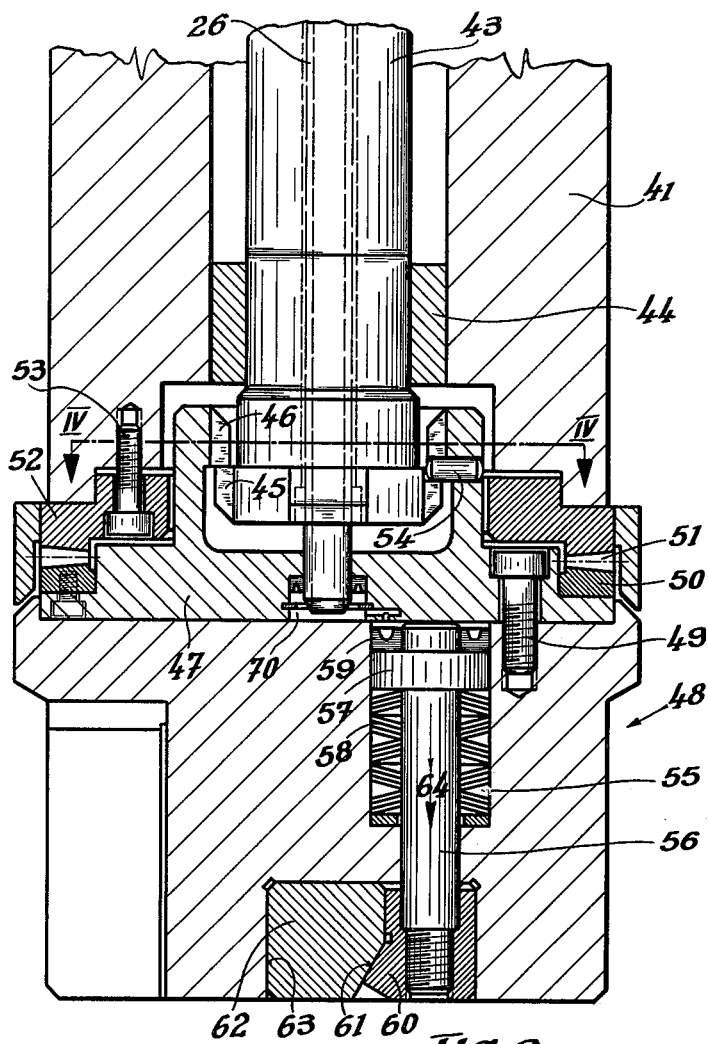
FIG. 3 illustrates on an enlarged scale a section through the lower end of the tool slide according to the invention.
Figure 4:
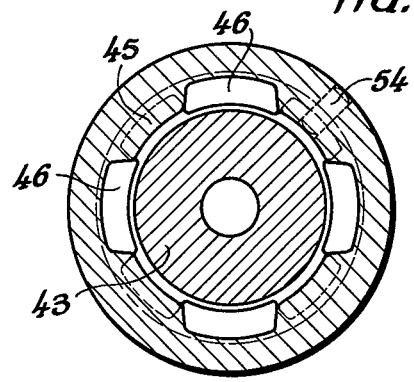
FIG. 4 is a section taken along the line IV — IV of FIG. 3 when the connecting teeth engage each other.
Figure 5:
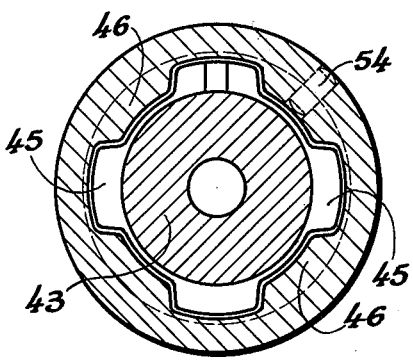
FIG. 5 is a section taken along the line IV — IV of FIG. 3 when the connecting teeth are disengaged from each other.
Figure 9:
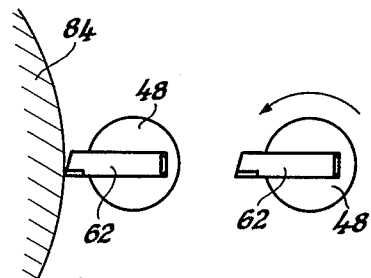

As will be seen from FIG. 3, the extension shaft 43 has its lower end rotatably journalled by a bearing bushing 44 in the lower housing body 41 of the tool slide. The free end of the extension shaft 43 is equipped with outer teeth 45 which cooperate with inner teeth 46 provided on the flange body 47. The flange body 47 represents the head portion of the tool head generally designated 48 and is connected thereto by screws 49. The head piece 48 furthermore comprises a gear ring 50 having associated therewith the spur teeth 51 on the annular body 52 which latter is connected to the lower end of housing body 41 by means of screw 53. Within the range between the teeth 45 and 46 there is provided a radially directed pin 54. This pin will during a pivoting operation prevent the outer teeth 45 on the extension shaft 43 from turning relative to the inner teeth 46 on flange body 47. According to FIG. 3, the tool head 48 is by means of the extension shaft 43 tightened against the housing body 41 while the spur gear rings 50 and 51 engage each other. In this way, the connection is assured and the teeth 45 and 46 rest directly upon each other as shown in FIG. 4. For purposes of disengaging the tool head 48, the extension shaft 43 is turned by an angle of 45°as a result of which the tool head 48 or its head body 47 occupies the position shown in FIG. 5 with regard to the extension shaft 43 and consequently the teeth 45 thereof. Thus, the teeth 46 on one hand and teeth 45 on the other hand are axially arranged opposite to each other in staggered position so that the tool head 48 is axially disengageable from the extension shaft 43 while prior thereto also the teeth 50 and 51 disengage each other.

According to FIG. 3, the tool head 48 has a cylinder bore 55 in which the clamping bolt 56 together with the piston dish 57 is axially displaceable while the piston dish 57 rests against the spring packets 58. Above the piston dish 57, the sealing ring 59 surrounds the free end of the clamping bolt 56. Screwed into the other end of the clamping bolt 56 is the clamping jaw 60 which by means of the inclined surface 61 chucks the tool 62 in the angular recess 63 of the tool head 48. For purposes of loosening the tool 62, the clamping bolt 56 has to be displaced in the direction of the arrow 64. This displacement is brought about by pressing a liquid pressure fluid into the cylinder bore 55 behind the piston dish 57. This liquid pressure medium overcomes the thrust of the spring packet 58 and threby spaces the clamping jaw 60 from the turning tool 62. The liquid pressure medium enters the space above the piston dish 57 through the pipe 26 and to this end is pressed through the connection 27 and the passages 28 and 29. When the pressure of the liquid medium subsides, the clamping bolt 56 is returned by the force of the spring packet 58, and the turning tool 62 in recess 63 is clamped fast.

As will be seen from FIGS. 6 and 7, the tool head 48 receives a series of turning tools. On one hand, the turning tool 62 of FIG. 7 shows that the clamping fast of the turning tool is not effected by means of the clamping bolt 56 shown in FIG. 3 but is effected rather by two or more of such clamping bolts the cylinder chambers 55 of which communicate with each other through a transverse bore 65.

Furthermore, FIGS. 6 and 7 show an additional turning tool 66 which have associated therewith two clamping bolts 56 the cylinder chambers of which communicate through passages 67, 68 and 69 and the connecting chamber 70 with the pipe 26. In a non-illustrated manner, also additional turning tools may be arranged in a corresponding manner. As will be seen from FIGS. 3, 6 and 7, the loosening or disengagement and clamping fast of the individual turning tools is effected hydraulically thereby meeting the requirements for a central control of the tool exchange. The tool exchange, however, requires that the tool which is to be exchanged individually is moved to its pivoting position in which it is located in a position aligned with the tool exchanger 12. This pivoting position is established by means which are clearly visible in and have been described in connection with FIG. 2 but which will once more be referred to. It may be assumed that the spindle stud 25 is in the spindle nut 23 according to FIG, 2. If now the shaft 16 of the motor 15 and thereby the pinion 17 is driven, a rotation is imparted upon the sleeve 19 which rotation brings about a longitudinal displacement in the direction of arrow 71 of the spindle stud 25 with the extension shaft 43 within the spindle nut 23 in the cylindrical housings 22 and 41. This downwrd displacement causes a corresponding downward displacement of the coupling and control body 31 so that the coupling jaws 32 and 33 engage each other. When this engaging position has been reached, the further rotation of sleeve 19 causes a movement of the coupling and control body 31 and thereby a rotation of the spindle stud 25. The thus initiated pivoting operation will in the predetermined position be stopped by means of the control cam 38' in combination with the control pins 40 and limit switches 39. The location and number of the control positions may be selected in conformity with the number of correspondingly arranged limit switches 39'. By means of a jack switch at the operator's station, the respective desired limit switch can be controlled and moved into its position for readiness. In this connection, the pins 35 serve for fixing the arrangement after the pivoting operation has been completed, while the precise fixing occurs at the lower end of the tool slide. To this end, there are provided the teeth 50 and 51 referred to above in connection with FIG. 3. In view of the displacement axially downwarly in the direction of the arrow 71 of the extension shaft 43, also the tool head 48 has been subjected to a corresponding displacement and thus its teeth 50 are disengaged from the teeth 51. In view of the fact that the teeth 46 and 45 are placed against each other, as described already in connection with FIGS. 3–5, a connection is established. When the extension shaft 43 has carried out the predetermined partial rotation and has occupied the fixed position intended by the pins 35, the pivoting drive reversed by the control cam 38' and the function-ready located limit switch 39' will bring about a rotary movement in opposite direction so that the threaded nut 23 will turn correspondingly in opposite direction. In this way, an axial displacement of the extension shaft 43 and of the spindle stud 25 is effected counter to the direction of the arrow 71. The spindle stud 25 will then again reach its starting position according to FIG. 2. In connection therewith, also the teeth 50 and 51 will engage each other again whereby the end centering between tool head 48 and tool slide or its cylinder body 41 is again restored. By means of the control ring 38, the limit switch 39 is actuated and the motor 15 is stopped. The pin 54 connected to the flange body 47 will during the pivoting operation prevent the tool head 48 from moving to the extension shaft 43, which means that the position of the teeth 45 and 46 does not change.

As has already been mentioned, the disengagement of the tool head 48 from the tool slide is effected in such a way that first the tool head 48 is by an axial displacement of the extension shaft 43 in downward direction moved away from the tool slide. Thereupon, the tool head 48 is supported from below so that the pin 54 between the teeth 45 and 46 is freed. The extension shaft 43 carries out a rotary movement for instance by 45° or a rotary movement in conformity with a limit switch 39' shifted to its function-ready position, so that the teeth 46 and 45 occupy the position of FIG. 5. Thus, the conditions have been established which will permit withdrawal of the tool head 48 or while holding said tool head 48 to move the tool slide upwardly.

The exchange of tools is illustrated more clearly in FIGS. 8 to 14 of which FIG. 8 illustrates the starting position of the tool head 48 with turning tool 62 at the start of the tool exchange operation and also shows a cutout of the tool exchanging device generally designated with the reference numeral 12. The head body 14 of the tool exchanging device 12 carries a plurality of tools which are distributed over the circumference of the head body 14. The disc-shaped head body 14 is in each depositing position provided with two upwardly and laterally directed fitting pins 72 and 73 of different design which are located within bores 74 and 75 and are arrested by means of pins 76. The turning tools 62 and 66 — tool 66 likewise having pins 72 and 73 associated therewith, comprise corresponding transversely directed fitting bores 77 and 78 and also comprise a bore 79 located in the rear end of tools 62 and 66, with closure screw 80 against which a spring 81 rests. Resting against said spring 81 is a ball body 82 which is intended for engagement with a depression 83 in pins 72, 73, in order in this way to assure a mounting of the turning tools 62, 66 on pin 72 after the turning tool 66 has been placed on the pins 72, 73. As will be evident from FIG. 8, the turning tool 66 can be grasped and displaced by the tool head 48 toward the left and can be withdrawn from the pins 72 and 73, whereas the turning tool 62 is to be disengaged and to be withdrawn in upward direction.

Assuming that the tool head 48 according to FIG. 8 is without a turning tool 62, the following steps are to be taken in order in the tool head 48 automatically to insert the turning tool 62 from the exchanging or changing head 14 according to the right-hand side of FIG. 8 into the tool head 48. First the tool head 48 is turned about its axis by an angle of 180°. This turning or pivoting movement is carried out by the pivot drive in the manner described in connection with FIGS. 2 and 3. Thereupon, the tool head 48 is moved toward the right in which instance the turning tool 62 still held in the changing head 14 is pushed into a recess 63 (according to FIG. 3) of the tool head 48. To this end, previously the clamping jaw 60 was disengaged in the manner described in connection with FIGS. 2 and 3 and, more specificaly, by the hydraulic displacement of the two clamping bolts 56. If then the turning tool 62 is fully inserted into the recess 63 of the tool head 48, i.e., until its engagement, the chucking of the turning tool is effected by reversing the pressure medium so that the spring force of the spring packet 55 becomes effective. This is followed by a vertical displacement of the tool head 48 in upward direction to which end the tool slide is displaced vertically. The turning tool 62 then disengages the holding pins 72 and 73 on the changing head 14. For the next changing operation, the turning tool 62 is in reverse sequence of the working operations placed upon the free receiving place of the tool change head 14. This is followed by a pivoting movement of the changing head 14 so that another turning tool will be able to pass into the starting position in alignment with the tool head 48 which will then be able to receive the next tool.

Figure 10:
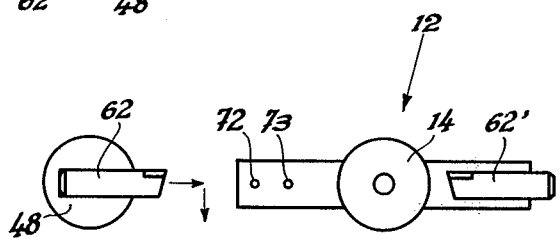
Figure 11:
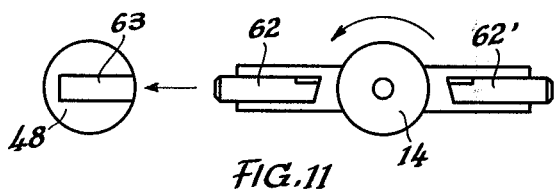
Figure 12:
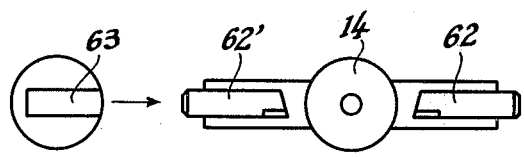
Figure 14:
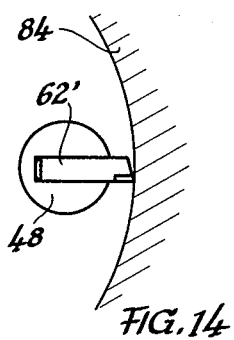
Figure 13:
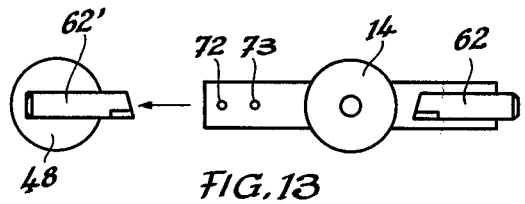

Such exchanging operations are diagrammatically illustrated in FIGS. 9–14. According to FIG. 9, a tool head 48 with a turning tool 62 occupies a machining operation with regard to the work piece 84, which latter is being machined on the outside. After the machining has been completed, the tool slide with the tool head 48 is moved out of its working position and toward the tool exchanger 12. The tool head 48 turns by an angle of 180°. Thereupon, the turning tool 62 is received by the changing head 14 and is held thereon by means of pins 72 and 73. This movement is illustrated in FIG. 10, whereas FIG. 11 shows the depositing position after the return of the tool head 48. This operation is then followed by a turning of the changing head 14 by an angle of 180° so that now in comformity with FIG. 12, the turning tool 62' is in alignment with tool head 48. Thereupon, the turning tool 62' is received by the tool head 48 by advancing the latter towared the changing head 14, the turning tool 62' is received and returned whereby the position according to FIG. 13 will be reached. After pivoting the tool head 48 at an angle of 180° and by correspondingly feeding the tool slide toward the work piece 84 which is now to be machined on the inside, the turning tool 62° occupies its starting position shown in FIG. 14. As will be evident from the above, all operations are carried out automatically without the necessity of having an operator initiate these movements, aside from the actuation of the electric switch in combination with the limit switches 39, 39' in order on one hand to move the tool head 48 into the respective desired aligned position with regard to the changing head 14, and on the other hand to carry out the hydraulic disengagement and chucking of the turning tool in the tool head 48. In this way, various upward and downward movements occur as well as displacement movements on the transverse beam 5 of the support 6 with the tool slide 7.

It is, of course, to be understood that the present invention is, by no means, limited to the particular showing in the drawings but also comprises any modifications within the scope of the appended claims.

What I claim is:

1. In a machine tool having a frame, spindle support means moveable vertically and transversely in said frame, a spindle in said support means comprising a spindle bar rotatable and axially moveable in said spindle, a tool head detachably connected to said spindle bar at the lower end and having at least one notch for receiving a tool, said tool head being rotatable on the spindle and being adapted to be locked to the spindle in rotated positions, a conduit extending axially through said spindle bar and adapted at the upper end to receive pressure fluid, said conduit at the lower end sealingly engaging a recess formed in the tool head, a clamp member in said notch for clamping a tool therein, cylinder bore means in the tool head, piston means connected to the clamp member and extending into said cylinder bore means, spring means acting on said piston means and urging said clamp member in tool clamping direction, and channel means in said tool head operable in at least one rotated position of the tool head on the spindle to communicate said cylinder bores with said recess whereby a supply of pressure fluid to said conduit will move said clamp member in tool releasing direction.

2. A machine tool according to claim 1 in which said tool head is moved in rotation and in the axial direction by said spindle bar, control switches for controlling the rotation of said tool head and the axial displacement thereof and for controlling the supply of pressure fluid to and the exhausting fluid from said conduit, and cam elements on said spindle bar coating with said control switches.

3. A machine tool according to claim 2 in which said switches and cam elements coact in response to both rotary and axial movement of said spindle bar.

4. A machine tool according to claim 1 in which said spindle bar is threaded at the upper end, a nut on the upper end of the spindle bar, a motor for driving said nut in rotation, cooperating elements of abutment means on said nut and spindle bar to limit relative axial movement of said nut and spindle bar, and detent means acting between said spindle bar and spindle for releasably holding said spindle bar in a predetermined rotated position until said abutment means elements abut.

5. A machine tool according to claim 1 which includes a tool magazine, tools in the magazine, locating pins in the magazine and tool head for engagement with the tools, said tools having holes to réceive said pins.

* * * * *